(12) United States Patent
Salerno

(10) Patent No.: US 7,530,324 B2
(45) Date of Patent: May 12, 2009

(54) BOAT MOUNTABLE FRAME FOR HOLDING FISHING EQUIPMENT AND METHOD OF INSTALLATION THEREOF

(76) Inventor: Anthony J. Salerno, 20455 S. Shore Rd., Three Mile Bay, NY (US) 13693

( * ) Notice: Subject to any disclaimer, the term of this patent is extended or adjusted under 35 U.S.C. 154(b) by 0 days.

(21) Appl. No.: 11/849,537

(22) Filed: Sep. 4, 2007

(65) Prior Publication Data
US 2008/0053360 A1 Mar. 6, 2008

Related U.S. Application Data

(60) Provisional application No. 60/842,767, filed on Sep. 6, 2006.

(51) Int. Cl.
*B63B 17/00* (2006.01)
(52) U.S. Cl. ........................ 114/364; 43/21.2
(58) Field of Classification Search ................. 114/255, 114/343, 364; 43/21.2; 248/511, 512, 513, 248/515, 520
See application file for complete search history.

(56) References Cited

U.S. PATENT DOCUMENTS

| | | | |
|---|---|---|---|
| 4,869,195 A * | 9/1989 | Eichfeld ..................... | 114/364 |
| 5,435,093 A * | 7/1995 | Minorics et al. ............ | 43/21.2 |
| 5,461,817 A * | 10/1995 | Flood ......................... | 43/19.2 |
| 5,673,507 A * | 10/1997 | Stokes, Jr. ................... | 43/21.2 |
| 5,685,107 A * | 11/1997 | Sweet ......................... | 43/21.2 |
| 6,289,627 B1 * | 9/2001 | Gibbs et al. ................. | 43/21.2 |
| 6,796,078 B1 * | 9/2004 | Bowman .................... | 43/21.2 |
| 7,047,688 B2 * | 5/2006 | Sandman, Jr. ............... | 43/21.2 |
| 7,264,218 B1 * | 9/2007 | Edwards ..................... | 248/511 |

* cited by examiner

*Primary Examiner*—Lars A Olson
(74) *Attorney, Agent, or Firm*—George R. McGuire; Bond, Schoeneck & King PLLC

(57) ABSTRACT

A hardware system for mounting upon a fishing boat includes one or more cylindrical frame members and a plurality of fishing rod holders, each having cylindrical base portion sized for sliding insertion over one of the frame members for linear movement along and 360° rotational movement about the axis thereof. In a first embodiment, first and second frame members are mounted at laterally opposite deck portions of the boat in parallel, vertical orientation with a third frame member extending horizontally between and attached to the vertical members. In a second embodiment, a cylindrical frame member extends horizontally between supports on opposite sides of the upper surface of a hard-top cabin covering; the connecting means permit the use of flat mounting plates with sloping side edges of the hard-top covering. In a preferred method of installation of the first embodiment, the distance between the vertical members is measured after mounting of the lower ends thereof to the boat and the horizontal member is then cut to the proper length for mounting between and connection to the vertical members, thus permitting the assembly of a frame system with boats within a range of widths at the position of frame member mounting.

16 Claims, 4 Drawing Sheets

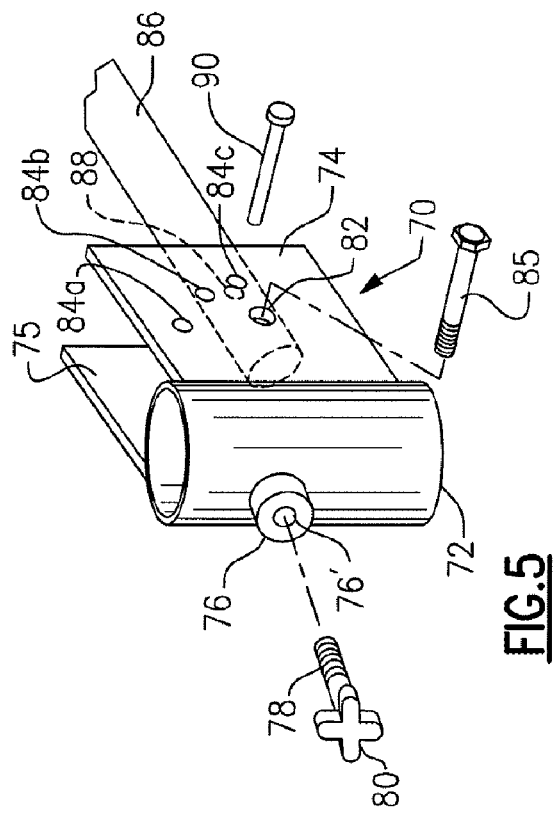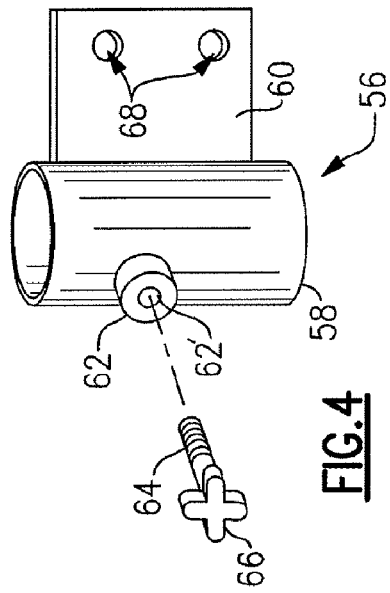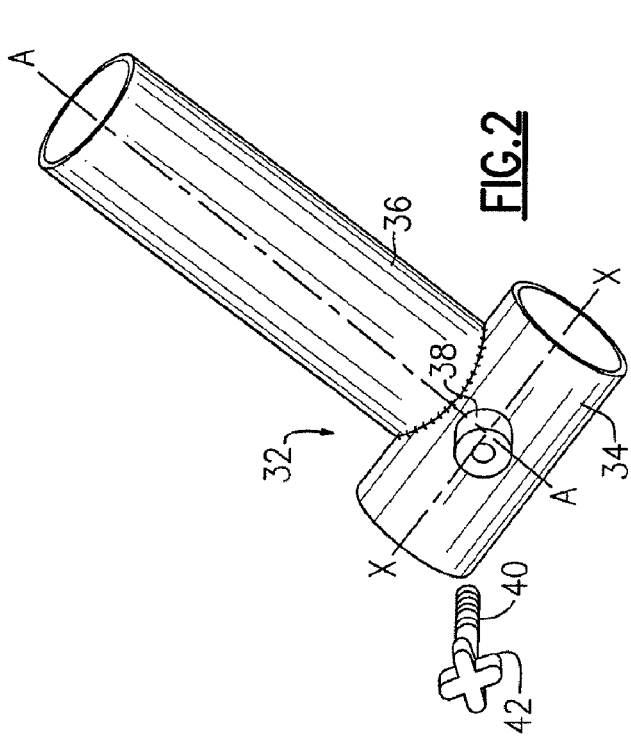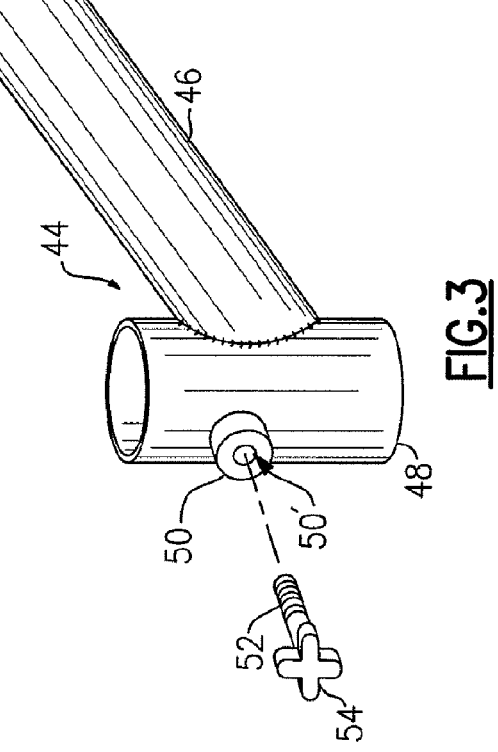

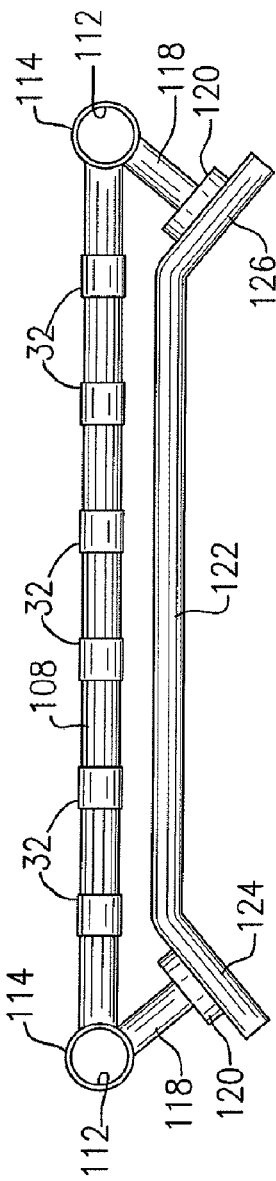
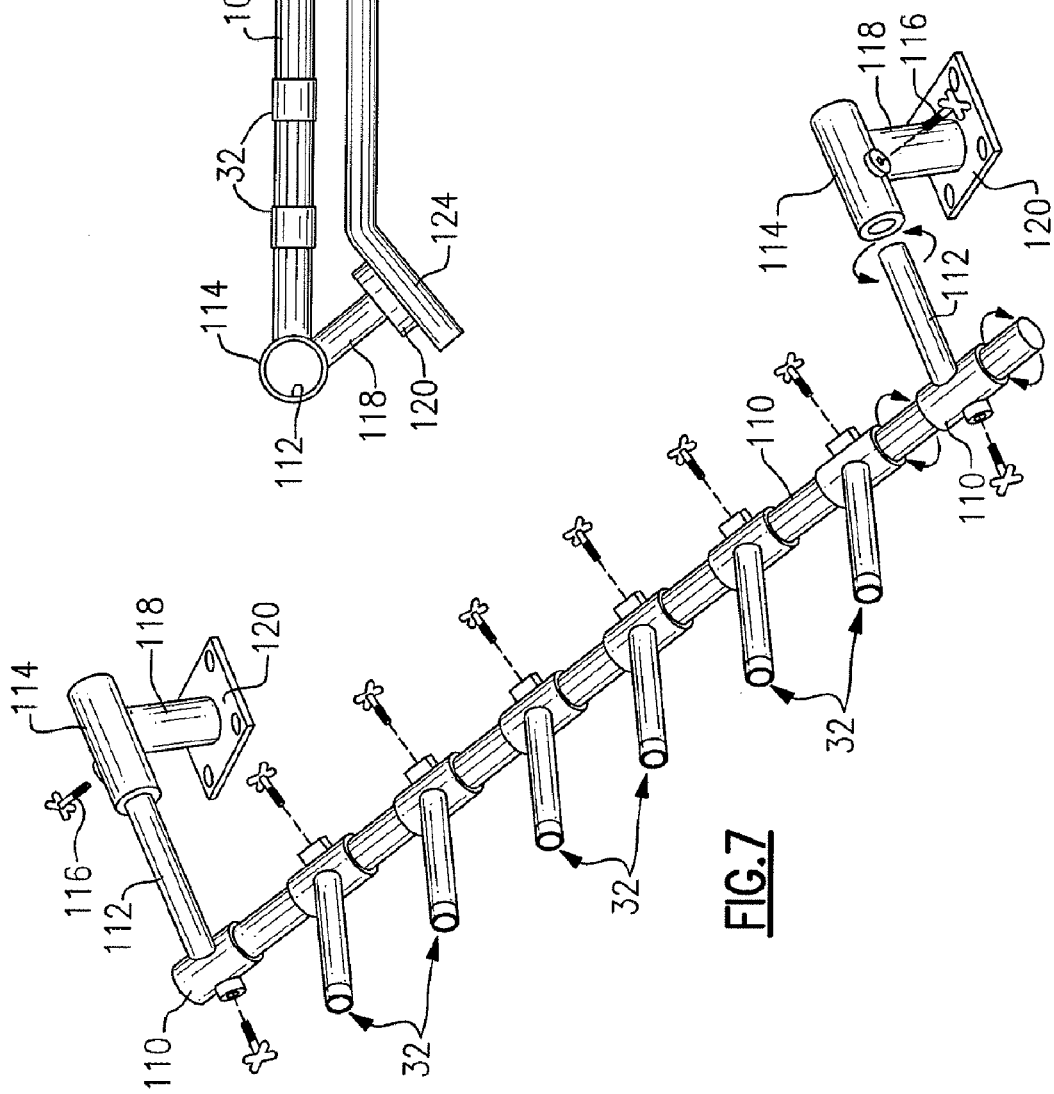
FIG. 8
FIG. 7

BOAT MOUNTABLE FRAME FOR HOLDING FISHING EQUIPMENT AND METHOD OF INSTALLATION THEREOF

CROSS REFERENCE TO RELATED APPLICATION

The present application claims priority to U.S. Provisional Application Ser. No. 60/842,767 of the same title, filed on Sep. 6, 2006, and hereby incorporated by reference.

BACKGROUND AND OBJECTS OF THE INVENTION

The present invention relates to fishing in general, and more specifically to a method of outfitting a boat with a system of hardware for holding fishing poles and other fishing items in desired positions, as well as to the configuration and assembled relationship of the various items of hardware.

Sport fishing boats are often provided with a type of holder for the base of fishing rods or poles which includes a hollow, tubular portion welded to a base. When a plurality of rods, together with other items such as planer boards, reels and pulleys for attachment of planer board line, outriggers, etc., is to be mounted on the boat, the common practice is to construct an inverted U-shaped frame to match the dimensions of the boat so that the ends of the two frame legs may be attached, e.g., by bolts and mounting plates, directly to the boat on each side. The rod holders are normally welded to or otherwise integral with the vertical and horizontal portions of the frame and are therefore not adjustable in position with respect to the frame or the boat. Since dimensions at the positions of frame attachment vary from boat to boat, this requires that the frame and hardware associated therewith be essentially custom made for each individual boat which is, in fact, a common practice.

It is a principal object of the present invention to provide a collection of hardware for use in a boat-mountable system of support frame, rod holders and, if desired, other items of fishing tackle and the like, and method of assembling the hardware which permits use of the system with boats of different dimensions.

Another object of the invention is to provide a novel and improved support frame and associated hardware which can quickly and easily be adapted for use on fishing boats of different dimensions at the position of frame attachment.

A further object is to provide a method of dimensionally modifying and assembling a support frame and system of rod holders, and the like, for mounting on a fishing boat of any dimensions, within a predetermined range, at the position of frame mounting.

Still another object is to provide a novel and versatile assemblage of interconnected hardware mountable upon a fishing boat for holding an array of fishing rods in spaced relation with a wide degree of selective adjustment of the holding components relative to a support frame.

Other objects will in part be obvious and in part appear hereinafter.

SUMMARY OF THE INVENTION

In a first aspect, the invention contemplates a support frame which is provided in three sections; when assembled and mounted on the boat these will consist of two vertical and one horizontal frame member. The distance between the two vertical frame members in the assembled condition of the frame is determined, e. g., by direct measurement of the boat upon which the frame is to be mounted at the desired position of mounting. The horizontal frame member is provided in a length which defines the maximum spacing of the vertical legs in their installed positions. However, the dimensions of the boat whereon the frame is to be mounted may require the spacing of the vertical frame members to be somewhat less than the maximum, in which case the horizontal member is cut to match the actual spacing of the vertical members in their installed positions.

The collection of hardware includes a plurality of fishing rod holders of the type including a hollow, tubular section affixed to a base which is mounted upon the support frame. The base or handle end of a fishing rod is inserted into the hollow tube as the baited end of the line is drawn through the water behind the boat. In the rod holders of the present invention the hollow lube in which the base of the fishing rod is inserted is fixedly attached, e.g., by welding, to a base comprising a length of extruded metal having walls defining a periphery of cross section slightly larger than the exterior of the frame members. Both the rod holder base and the frame members are preferably hollow, cylindrical extrusions, whereby the frame member may be inserted through the rod holder and the latter moved to a desired position along the length of the frame member, as well as being placed in any desired rotational position about the axis of the frame member. The base also includes an internally threaded, radial passageway through which a threaded spindle having a manually engageable handle extends. The handle is rotated to bring an end portion thereof into frictional engagement with the surface of the frame member surrounded by the holder base, thereby releasably retaining the holder in a desired position relative to the frame while providing quick and simple adjustment of this position both axially and rotationally of the frame member. In addition to rod holders, other items of fishing equipment, described later herein, may be releasably mounted upon the frame. This highly versatile feature of adjustability is described in embodiments wherein vertical frame members are connected to deck areas of the boat and wherein a horizontally oriented frame member is mounted to a hardtop cabin covering.

The foregoing and other features of construction and assembly of the component parts will be more readily understood and fully appreciated from the following detailed description, taken in conjunction with the accompanying drawings, wherein:

BRIEF DESCRIPTION OF THE DRAWINGS

FIGS. 2 and 3 are perspective views of rod holders for mounting on the frame upon frame members with horizontal and vertical axes, respectively;

FIGS. 4 and 5 are perspective view of other elements of hardware for mounting upon a vertically oriented frame member;

FIGS. 7 and 8 are perspective and elevational views, respectively, of another embodiment of the holding frame of the invention, showing portions of the boat upon which it is mounted.

DETAILED DESCRIPTION

Figure 1:
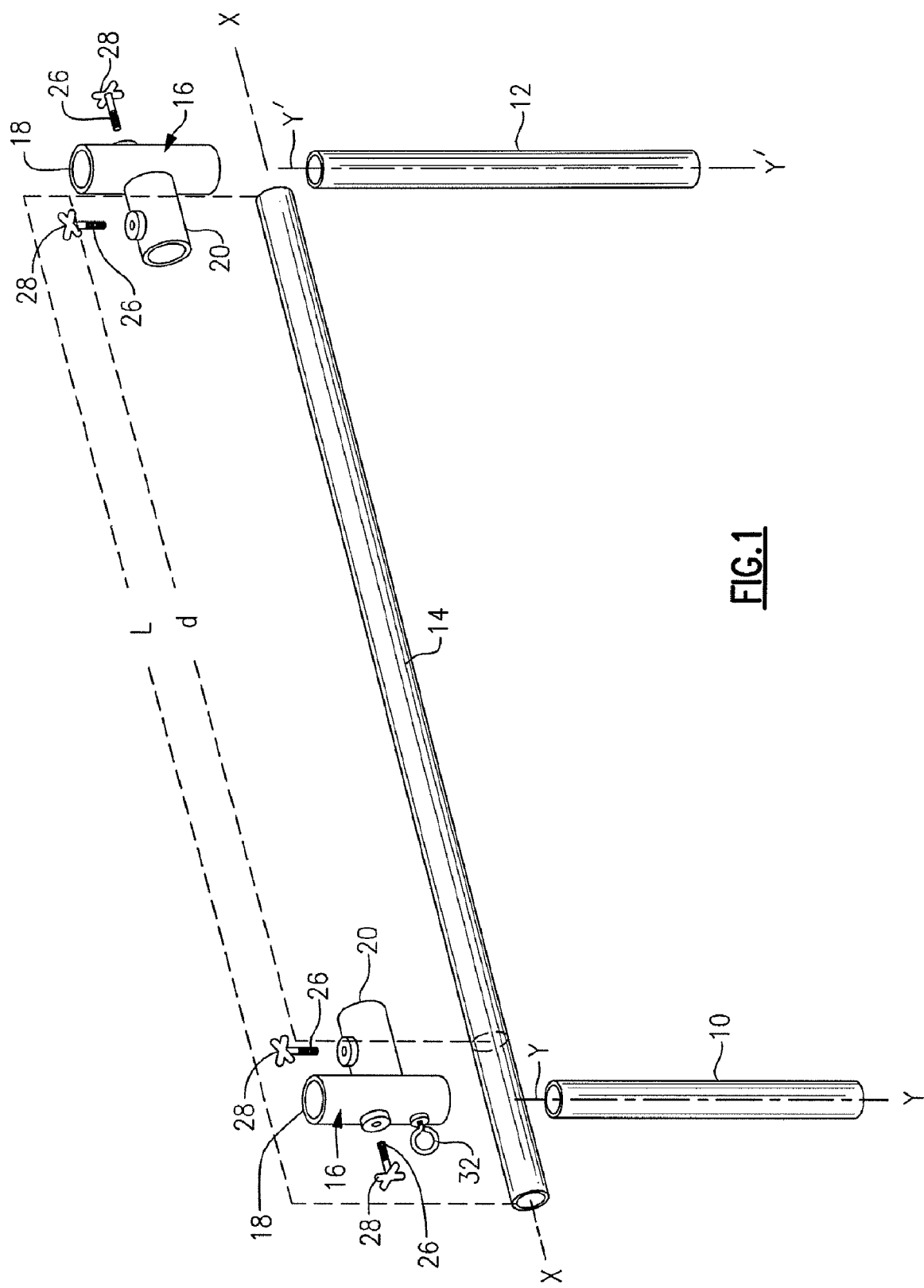
FIG. 1 is a perspective view of elements of hardware forming portions of a boat-mountable support frame in a first embodiment of the invention, prior to mutual assembly.

Referring now to the drawings, in FIG. 1 is shown portions of a first embodiment of the invention including first, second and third elongated frame members denoted by reference numerals 10, 12 and 14, respectively. In the preferred embodiment, the three members are hollow and round in cross section, and may conveniently be fabricated as aluminum extrusions. The three elongated members are mutually assembled as described later to provide a support frame intended for mounting on a boat with two of the elongated members 10 and 12 in a substantially vertical orientation with member 14 extending between the upper ends thereof in the manner of an inverted U. The central axes of horizontally extending elongated member 14 is denoted X-X, and the central axes of vertically oriented members 10 and 12 are denoted Y-Y and Y',Y', respectively. The position on the boat where the lower ends of members 10 and 12 are to be mounted is, in the present embodiment, in an area somewhat forward of the stern, essentially at the outer limits of the deck on port and starboard sides. Since this distance may vary appreciably from boat to boat, it is a common practice to fabricate a complete support frame specifically to fit the boat upon which it is to be mounted. In this embodiment of the present invention, the hardware is provided in a form which permits mounting and use thereof on boats of different dimensions in the areas where the support frame is mounted, all as explained in more detail hereinafter.

Also shown in FIG. 1 are a pair of connector elements 16. These include hollow, cylindrical members 18 and 20, with an end of member 18 fixedly connected, e.g., by welding, to an outer surface of member 20. The central axes of members 18 are denoted X-X and the central axes of elements 16 on the left and right sides are denoted Y-Y, and Y'-Y', respectively, to indicate that the elements are coaxial with the horizontal and vertical elongated members 14, 10 and 12, respectively, in the assembled condition, with opposite ends of member 14 extending into members 18 of the connector elements, and upper ends of members 10 and 12 extending through members 20 of the left and right connector elements, respectively. The inner diameters of members 18 and 20 are equal to or slightly larger than the outer diameters of elongated members 10, 12 and 14 to permit sliding assembly of such elements. Each of members 18 has fixedly attached to an outer surface thereof round 22, and round 24 is fixedly attached to each of members 20. Rounds 22 and 24 of both connector elements 16 have central passageways 22' and 24', respectively which extend through the wall of the associated cylindrical member 18 and 20. Passageways 22' and 24' are tapped with threads to accept the external threads of spindle 26 having manually engageable handle fixedly attached thereto. Thus, after sliding assembly of the elongated members and the connectors, the terminal ends of spindles 26 extending through rounds 22 may be tightened to frictionally engage outer surface portions of horizontally oriented member 14 and the spindles extending through rounds 24 may be tightened to frictionally engage outer surface portions of vertically oriented members 10 and 12 and maintain horizontal member 14 at an adjustably desires height. Round 30, also having a threaded central passageway, is fixedly attached to cylindrical member 20 of each connector 16 for purposes described later.

Other elements of hardware to be mounted on the support frame are separately shown in FIGS. 2 through 5. Element 32 includes hollow, cylindrical portions 34 and 36, an end of the latter being fixedly attached to an outer surface of the former with central axes of the two portions perpendicularly intersecting. Round 38, having threaded central passageway 38', is fixedly attached to an outer surface portion of portion 34 to accept threaded spindle 40 having handle 42. One or more elements 32 may be placed upon, in sliding engagement with, horizontal member 14 and placed in a desired position both linearly along and rotationally about member 14, whereupon spindle 40 is rotated to bring its end portion into frictional contact with the outer surface of member 14. The central axis of portion 34 is denoted X-X to indicate that it is coaxial with member 14 in the assembled condition. Axis A-A of portion 36, which provides a holding member for the base or handle end of a fishing rod, is adjustable 360° about axis X-X.

Element 44 includes hollow, cylindrical portions 46 and 48, fixedly attached along axes which are intersecting, but not perpendicular, the central axis of portion 48 being denoted Y-Y and Y'Y' to indicate that it be slidingly inserted on either of vertically oriented members 10 and 12. Round 50 is attached to portion 48 and includes central passageway 50' for accepting spindle 52. Handle 54 is rotated to bring the end of the spindle into contact with the vertical frame member, thereby adjustably fixing the position of element 44 upon vertical member 10 or 12 with 360° adjustability about the vertical axis. Portion 46 provides a holder for the base of a fishing rod, or other tackle such as a net.

Referring now to FIG. 4, element 56 includes hollow, cylindrical portion 58 and flat bracket 60, fixedly secured along one edge to portion 58. Round 62 is affixed to a surface of portion 58 and includes threaded passageway 62' for accepting spindle 64. Element 56 is slidingly inserted on frame member 10, placed in a desired orientation thereon, and handle 66 rotated to bring the terminal end of spindle 64 into frictional contact with the outer surface of portion 58, thereby releasably fixing the position of element 56 upon frame member 10. A pair of openings 68 in plate 60 are appropriately spaced to accept threaded members for attaching a planer board retrieval reel to element 56, and thus to vertical frame member 10.

Element 70, shown in FIG. 5, includes hollow, cylindrical portion 72 and a pair of flat plates 74 and 75, each fixedly attached along one edge to the surface of portion 72. Plates 74 and 75 are parallel to one another and the attached edges are parallel to the central axis of portion 72, denoted Y-Y as portion 72 is coaxial with member 10 when element 72 is mounted thereon. Round 76 is fixedly attached to the surface of portion 72 and includes threaded, central passageway 76' for threaded insertion of spindle 78. Handle 80 is rotated to bring spindle 78 into frictional contact with element 10, thereby adjustably fixing the position of element 70 upon frame member 10. Plate 74 includes through opening 82 and an array of openings 84a, 84b and 84c spaced at equal distances from opening 82 on the arc of a circle with opening 82 at its center. Although not seen in FIG. 5, plate 75 includes through openings aligned with openings 82, 84a, 84b and 84c of plate 74. Bolt 85 extends through opening 82, openings through opposing wall portions of hollow tube 86 and the opening in plate 75 in alignment with opening 82, thereby pivotally mounting tube 86 upon element 70. Opening 88, extending through opposite walls of tube 86, may be selectively aligned with one of openings 84a, 84b and 84c, and pin 90 inserted through the openings in plate 74, tube 86 and plate 75 for angular adjustment of the axis of tube 86 in a vertical plane about the axis of opening 82. As discussed later, the purpose of element 70 is to provide a holding and positioning system for an outrigger pole.

Figure 6:
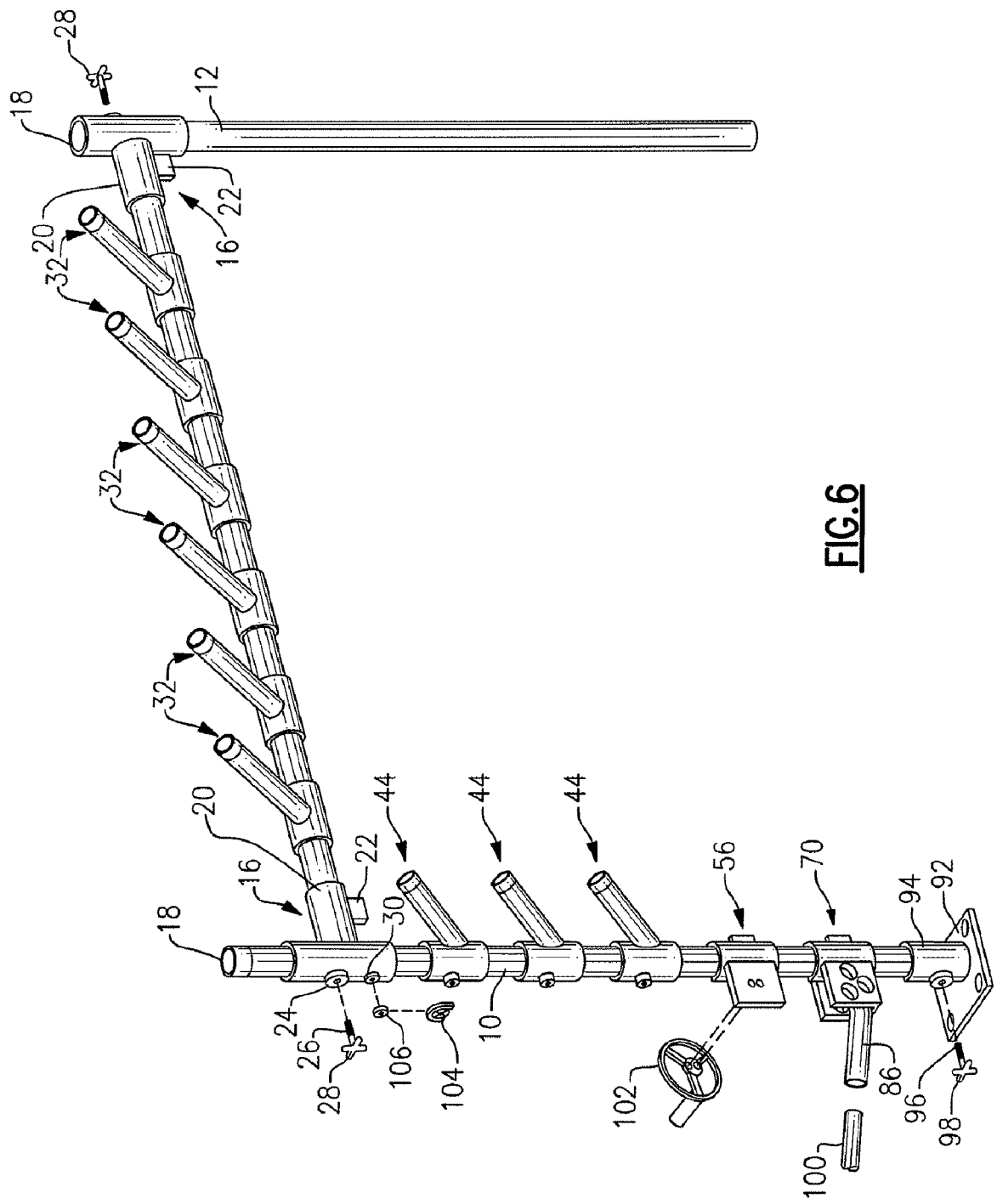
FIG. 6 is a perspective view of a fully assembled example of the first embodiment of the invention.

A typical support frame and hardware element assembly is shown in FIG. 6. The preferred sequence of assembly is to place elements 44, 56 and 70 upon members 10 and 12 (although shown only on member 10, for convenience) and frictionally engage the frame members with the threaded spindles in the desired axial and rotational positions. The lower ends of members 10 and 12 are then placed in a mounting base including plate 92, which is bolted to the deck or other desired portion of the boat, and hollow cylindrical element 94, fixedly attached to plate 92 with its central axis vertically oriented. The lower ends of the frame members are retained in the mounting base by spindle 96, tightened by rotation of handle 98. After the two vertical frame members have been mounted in their respective bases the distance between the upper ends of these members is measured. If this dimension is less than the original length of member 14, a single cut is made, trimming the length of member 14 to slightly less than the dimension between the vertical members. As many of elements 32 as desired are then placed on member 14 and frictionally retained in the desired axial and rotational positions thereon. Connector elements 16 are then placed on each end of member 14 and portions 20 are slidingly inserted over the upper ends of elements 10 and 12. The spindles are tightened to maintain the horizontal element at the desired vertical position.

Tube 86 of element 70 holds an outrigger pole, a portion of which is seen at 100. Reel 102 is mounted upon element 56 and pulley 104 is mounted by eye bolt 106 on threaded round 30 of connector element 16, the pulley and reel serving to control the line by which a conventional planer board is towed laterally of the boat. It should be noted that an advantageous feature of permitting 360° rotational movement of the hardware upon the frame members is that certain elements may be temporarily moved from their operative positions to a position where they do not interfere with operation of another element. For example, with outrigger rod 100 removed from tube 86, element 70 may be rotated upon member 10 away from its operative position with tube 86 extending laterally outward to permit free access to and operation of reel 102.

Turning now to FIGS. 7 and 8, another embodiment of the holding frame, suitable for mounting upon a hardtop cabin covering, is shown. A plurality of rod holders 32, identical to those of the previously described embodiment, including the spindles for tightening to maintain the selective axial and rotational orientation of the holders, are telescopingly mounted upon elongated frame member 108. End support members, including base portions 110, slidingly inserted on opposite ends of frame member 108, and end posts 112, fixedly attached to the base portions with central axes of the end posts and base portions perpendicular. End posts 112 are slidingly inserted through hollow, cylindrical members 114 and retained in a desired position by spindles 116. Portions 118 are fixedly attached at opposite ends to members 114 and base plates 120, the latter having openings for insertion of mounting screws to attach the plates to the upper surface of a hardtop cabin covering. FIG. 8 shows a hardtop cabin covering 122 of a typical boat of this type in front elevation. It is common for such coverings to slope downwardly toward the sides, at least along the edge portions denoted by reference numerals 124 and 126. Because cylindrical members 114 are rotatable about end posts 112, base plates 120 may be placed in directly opposed, surface-to-surface relationship to the upper surface of covering 122 along the sloped edges, as seen in FIG. 8.

Thus, in a first embodiment, the present invention provides an assemblage of hardware, and method of preparing such hardware for installation on a particular boat, allowing use thereof with different boats of varying configuration and dimensions. The length of the horizontal frame member is tailored to the space between the vertical frame members by providing a horizontal frame member of the longest anticipated length and making a single cut, if necessary, to reduce that length to match the actual spacing of the vertical frame members. Also, considerable leeway is provided in adjustment of the height of the horizontal member above the bases of the vertical members by tightening the connectors at opposite ends of the horizontal member at the desired location on the vertical members. In a second embodiment, a holding frame for a plurality of rod holders or other such hardware is also provided for mounting on a boat with a hard-top cabin.

What is claimed is:

1. A system of hardware for mounting on a boat to hold a plurality of fishing poles in spaced relation, said system comprising:

a. a first, cylindrical member having a substantially uniform outside diameter, elongated along a substantially linear, first axis;

b. attachment means for affixing said first member to said boat in a substantially horizontal orientation;

c. said attachment means including a mounting plate having a substantially flat surface for contacting a surface portion of said boat, and means connecting said mounting plate to said first member for relative movement with respect thereto, and wherein said mounting plate is connected to said first member for linear movement of said mounting plate along said first axis for rotational movement of said mounting plate about said first axis and for rotational movement of said mounting plate about a second axis, substantially perpendicular to said first axis;

d. at least two rod holders, each having a hollow, cylindrical base with an inside diameter slightly larger than said outside diameter slidingly mounted upon said first member for linear movement along said first axis and 360 degree rotational movement about said first axis, and a hollow, cylindrical holding portion for accepting and supporting an end portion of a fishing rod inserted therein; and e. manually operable locking means for releasably fixing the position of said rod holders with respect to said first member.

2. A system of hardware for supporting a plurality of fishing rods in spaced relation with respect to a boat upon which said system is mounted, said system comprising:

a. first and second cylindrical members each having a substantially uniform outside diameter and elongated along first and second, linear axes, respectively;

b. first and second mounting means for supporting lower ends of said first and second members, respectively, in spaced, parallel relation upon said boat with said first and second members in substantially vertical orientation;

c. a third cylindrical member having a substantially uniform outside diameter and elongated along a third, linear axis;

d. first and second connection means for releasably connecting said third member to each of said first and second members, respectively, with said third axis in substantially horizontal orientation, said first and second connection means each comprising first and second cylindrical portions fixedly connected to one another in perpendicular relation, said first portion being sized for telescoping engagement with either of said first and second members and said second portion being sized for sliding engagement with said third member;

e. a plurality of rod holders each having a hollow, cylindrical base with an inside diameter slightly larger than said outside diameter slidingly mounted upon each of said first, second and third members for movement along and 360 degrees about the axis thereof, and a holding portion affixed to said base and having a hollow, cylindrical holding portion for accepting and supporting an end portion of a fishing rod; and f. manually operable locking means for releasably fixing the positions of said rod holders with respect to said first, second and third members.

3. The hardware system of claim 2 wherein said first, second and third members are of the same outside diameter, and wherein said first and second members extend fully through said first portion of a respective one of said connector means and opposite ends of said third member extend partially through respective ones of said second portions of said connector means.

4. The hardware system of claim 2 and further including at least one outrigger rod holder having a cylindrical base portion of inside diameter slightly larger than said outside diameter of said first and second members for sliding insertion of said outrigger rod holder upon one of said first and second members and movement relative thereto linearly along and 360° about said axis thereof and a holding portion sized to accept an end portion of an outrigger rod and to hold said rod to extend laterally of the boat.

5. The hardware system of claim 4 where said outrigger rod holder holding portion is pivotally mounted to said base portion for selective movement about a pivot axis between a plurality of vertical angles.

6. The hardware system of claim 2 and further including a pulley holder having a cylindrical base portion of inside diameter sized for sliding insertion over one of said first and second members for linear movement along and 360° about said at least one member, and a pulley mounted to said pulley holder.

7. A method of equipping a fishing boat with a holding frame for a plurality of fishing rods, said method comprising the following steps performed in the order recited:
 a. mounting at laterally opposite sides of said boat first and second cylindrical members having substantially uniform outside diameters and elongated along first and second, linear axes, respectively, between first and second ends, said members being mounted at said first ends thereof and extending in substantially parallel relation to said second ends, at a vertical position higher than said first ends;
 b. measuring the linear distance between said first and second members;
 c. cutting a third cylindrical member having a substantially uniform outside diameter and elongated along a third, linear axis between opposite ends to a length not greater that said linear distance;
 d. slidingly inserting over at least one of said first, second and third members a plurality of fishing rod holders each having a cylindrical base portion having an inside diameter sized for telescoping engagement with said first, second and third members and a holding portion sized to accept and support an end portion of a fishing rod, said holding portion being mounted to said cylindrical portion;
 e. connecting said third member at said opposite ends thereof to said first and second members, respectively; and
 f. selectively adjusting the positions of said third member opposite ends along said first and second axes, respectively.

8. The method of claim 7 wherein said first and second members are mounted in substantially vertical orientations and said third member is mounted in substantially horizontal orientation.

9. The method of claim 7 and further including placing each of said fishing rod holders in a desired longitudinal and rotational position with respect to the respective first, second and third member upon which it is mounted, and releasably fixing the positions of said holders with respect to said first, second and third members.

10. The method of claim 7 and further including slidingly inserting over at least one of said first and second members an outrigger rod holder having a second, cylindrical base portion sized for telescoping engagement with said at least one member, and a second holding portion sized for accepting and supporting an end portion of an outrigger rod.

11. The method of claim 7 wherein said first and second members are mounted to said boat at positions spaced substantially the full width of the boat at the fore and aft position of said mounting.

12. A system of hardware for mounting upon a boat to hold a plurality of fishing poles in spaced relation, said system comprising:
 a. a first, cylindrical member having a substantially uniform outside diameter, elongated along a substantially linear, first axis;
 b. attachment means for affixing said first member to said boat in a substantially vertical orientation;
 c. at least two rod holders, each having a hollow, cylindrical base with an inside diameter slightly larger than said outside diameter slidingly mounted upon said first member for linear movement along said first axis and 360 degree rotational movement about said first axis, and a hollow, cylindrical holding portion for accepting and supporting an end portion of a fishing rod inserted therein;
 d. manually operable locking means for releasably fixing the position of said rod holders with respect to said first member; and
 e. a planer board retrieval reel holder including a third, hollow, cylindrical base with an inside diameter slightly larger than said outside diameter slidingly mounted upon said first member for sliding movement along said first axis and 360 degree rotational movement about said first axis, and a crank operated reel mounted to said reel holder.

13. A system of hardware for supporting a plurality of fishing implements with respect to a boat upon which said hardware is mounted, said system comprising:
 a. first and second members elongated along first and second axes, respectively;
 b. first and second mounting means for supporting said first and second members, respectively, upon said boat;
 c. a third member elongated along a third axis;
 d. first and second connection means connecting said third member to said first and second members, respectively, for selective adjustment of the vertical distance between said third member and said boat;
 e. a plurality of fishing implement holders mounted to said third member for movement therewith relative to said boat during said selective adjustment; and
 f. first locking means for releasably fixing the vertical distance of said third member with respect to said boat and second locking means for releasably fixing the positions of said holders with respect to said third member.

14. The hardware system of claim 13 wherein said first and second members are substantially parallel to one another in substantially vertical orientations, and said third member is substantially perpendicular to said first and second members in substantially horizontal orientation.

15. The hardware system of claim 13 wherein at least one of said holders is mounted to each of said first, second and third members.

16. The hardware system of claim 15 wherein said holders are selectively adjustable both parallel to and about the axis of the respective member upon which they are mounted.

* * * * *